United States Patent [19]
Jarrett

[11] Patent Number: 6,155,157
[45] Date of Patent: Dec. 5, 2000

[54] METHOD AND APPARATUS FOR MAKING A TWO PIECE UNITARY PISTON

[75] Inventor: Mark W. Jarrett, Morton, Ill.

[73] Assignee: Caterpillar Inc., Peoria, Ill.

[21] Appl. No.: 09/167,444

[22] Filed: Oct. 6, 1998

[51] Int. Cl.[7] .................................................. F01B 31/08
[52] U.S. Cl. .............................................. 92/186; 92/231
[58] Field of Search ........................ 92/186, 231, 260; 123/193.6, 193.4; 29/808.04, 888.042, 888.044

[56] References Cited

U.S. PATENT DOCUMENTS

| | | | |
|---|---|---|---|
| 3,877,351 | 4/1975 | Barfiss | 92/220 |
| 3,974,381 | 8/1976 | Rohrle et al. | 250/310 |
| 4,180,027 | 12/1979 | Taylor | 123/41.35 |
| 4,212,281 | 7/1980 | Ernest | 123/193 H |
| 4,286,505 | 9/1981 | Amdall | 92/186 |
| 4,346,646 | 8/1982 | Ellermann | 92/220 |
| 4,847,964 | 7/1989 | Adams et al. | 29/156.5 |
| 4,867,119 | 9/1989 | Cooper et al. | 123/193 P |
| 4,941,440 | 7/1990 | Weber et al. | 123/193 P |
| 5,040,454 | 8/1991 | Ballheimer et al. | 92/177 |
| 5,081,967 | 1/1992 | Kemnitz et al. | 123/193 P |
| 5,115,726 | 5/1992 | Daxer et al. | 92/219 |
| 5,245,752 | 9/1993 | Lippai et al. | 29/888 |
| 5,279,268 | 1/1994 | Brink et al. | 123/197.2 |
| 5,359,922 | 11/1994 | Martins | 92/189 |
| 5,499,572 | 3/1996 | Cobble | 92/212 |
| 5,913,960 | 6/1999 | Fletcher-Jones | 92/219 |
| 6,032,619 | 3/2000 | Zhu et al. | 123/41.35 |

*Primary Examiner*—Edward K. Look
*Assistant Examiner*—Thomas E. Lazo
*Attorney, Agent, or Firm*—Larrry G. Cain

[57] ABSTRACT

Past pistons have been susceptible to reduced longevity due to increased forces of combustion thereon during operating cycles of an engine. The present two piece unitary piston increases the longevity of pistons used with increased forces of combustion. For example, a head member has a crown portion defining a ring band portion having a bottom surface and a support portion. And, a skirt member defines a ring band support surface and a top surface. The head member and the skirt member have a preestablished material strength being generally the same. The head member and the skirt member are joined by an inertia welding process. The force of combustion acting on the crown portion is resisted by the ring band support surface being in contacting relationship with the bottom surface. Thus, the skirt member structure supports and resists the bending moment of the combustion forces on the head member.

11 Claims, 5 Drawing Sheets

Fig_1_

Fig_2_

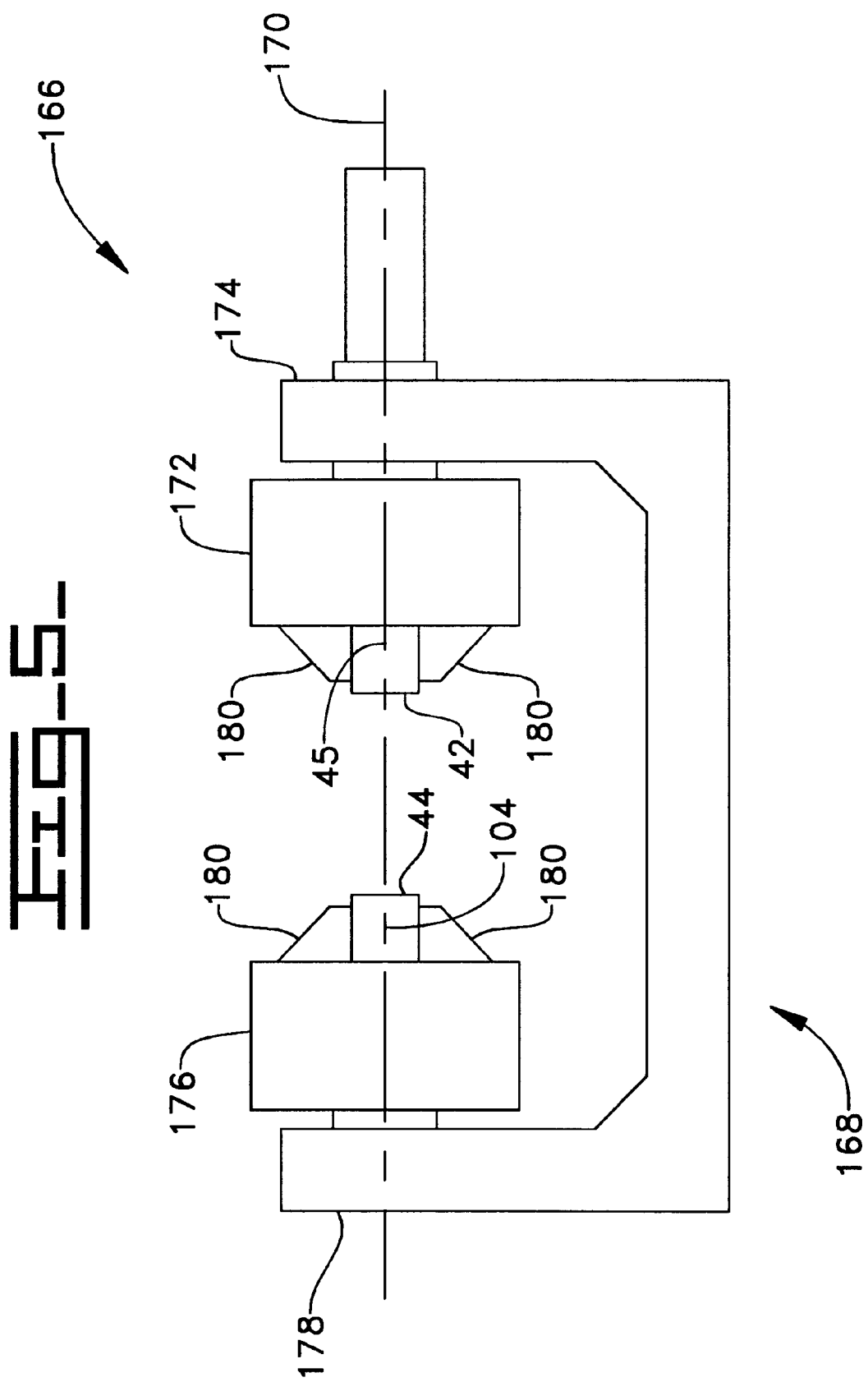

METHOD AND APPARATUS FOR MAKING A TWO PIECE UNITARY PISTON

TECHNICAL FIELD

This invention relates generally to an engine and more particularly to a method and apparatus for making a piston used in the engine.

BACKGROUND ART

The development of engines over the past few years have included increasing the horse power without increasing the displacement of the engine. To obtain the increased horsepower, it has been necessary to increase the combustion pressures within the combustion chamber which are transferred through the piston into the connecting rod and crankshaft.

Such increase in pressures have required the improvement of the integrity of the piston to withstand the increased stresses thereon. In the past and in many cases today, such pistons are made of aluminum or cast iron. Or, in some applications have used an articulated piston having a steel head and an aluminum skirt. Such an example is shown in U.S. Pat. No. 5,040,454 issued on Aug. 20, 1991 to Benny Balheimer and Stephen G. Shoop.

As the pressures of engine designs increase, further requirements for the improvement of the integrity of the piston to withstand the increasing stresses thereon has become more apparent. As the pressures increase and consequently the stresses increase attempts have been made to resist, for example, bending stresses. One such example, is shown in U.S. Pat. No. 3,877,351 issued Apr. 15, 1975 to Eugen Barfiss. A ring zone of an upper part being made of steel and being supported by a lower part consisting of an aluminum alloy. The upper part and the lower part are joined by a bolted connection in a removable method of attachment. Additionally, U.S. Pat. No. 4,346,646 issued Aug. 31, 1982 to Jurgen Ellermann discloses a crown of steel being connected with a piston body of aluminum. An annular skirt supports the piston body. The crown and the piston body are joined by a bolted connection in a removable method of attachment.

Other piston assemblies are joined in a fixed manner such as by welding. For example, U.S. Pat. No. 5,359,922 issued Nov. 1, 1994 to Jose M. Martins Leites et. al. discloses a method of manufacturing an articulated piston head wherein two portions are joined by friction welding. U.S. Pat. No. 5,245,752 issued Sep. 21, 1993 to Andre Lippai et. al. discloses a two-piece piston having two portions friction welded together, U.S. Pat. No. 4,286,505 issued Sep. 1, 1981 to John K. Amdall discloses a two piece piston being joined by a brazing process, and U.S. Pat. No. 3,974,381 issued Aug. 10, 1976 to Manfred Rohrle, et. al. discloses a method of welding a workpiece including an electron beam welding.

The present invention is directed to overcoming one or more of the problems as set forth above.

DISCLOSURE OF THE INVENTION

In one aspect of the invention a two piece unitary piston is adapted for use with an engine. The two piece unitary piston is comprised of a head member being made of a material having a preestablished material strength. A crown portion is connected to a ring band portion. The ring band portion defines a bottom surface. And, a support portion defines a mating surface having a preestablished surface area. A skirt member is made of a material having a preestablished material strength being substantially the same as the preestablished material strength of the head member. A ring band support surface is aligned with the bottom surface and has a top surface aligned with the mating surface. The head member and the skirt member being joined forming the two piece unitary piston. The joining being at the interface of the bottom surface and the mating surface, and the ring band support surface and the top surface respectively. And, said joining being formed by an inertia welding process.

In another aspect of the invention a method of making a two piece unitary piston is comprising of the following steps. Positioning a head member within a first chuck member. Centering the head member about a central axis. Positioning a skirt member within a second chuck member. Centering the skirt member about the central axis. Rotating at least one of the first chuck member having the head member centered on the axis and the second chuck member having the skirt member centered on the axis. Moving at least one of the first chuck member and the second chuck member axially toward the other. Interfacing the head member with the skirt member. And, forcing at least one of the head member into heat generating contact with the skirt member.

BRIEF DESCRIPTION OF THE DRAWINGS

FIG. 5 is a side view of a machine for making the two piece unitary piston.

BEST MODE FOR CARRYING OUT THE INVENTION

Figure 1:
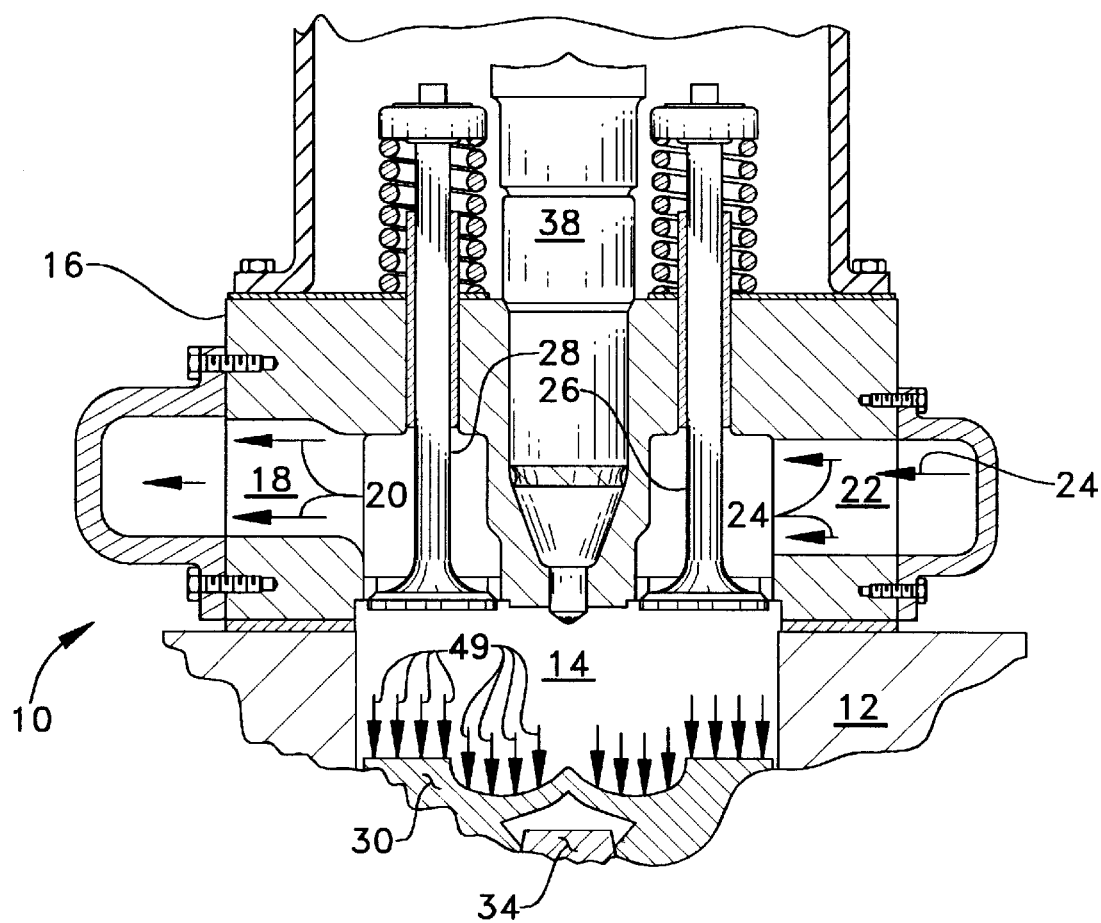
FIG. 1 is a partially sectioned view of an engine embodying the present invention.
Figure 2:
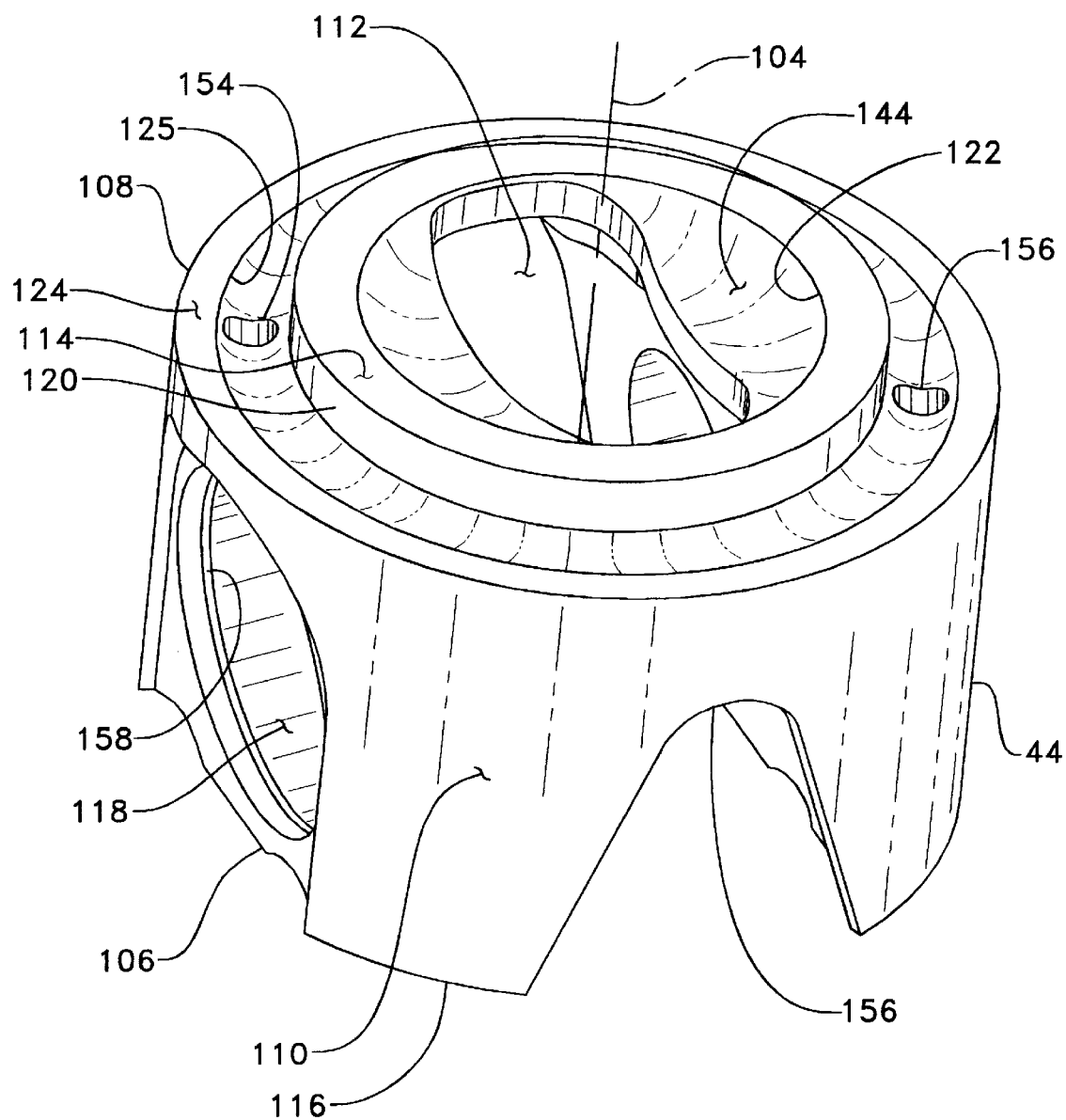
FIG. 2 is an isometric sectioned view of one piece of a two piece unitary piston.
Figure 3:
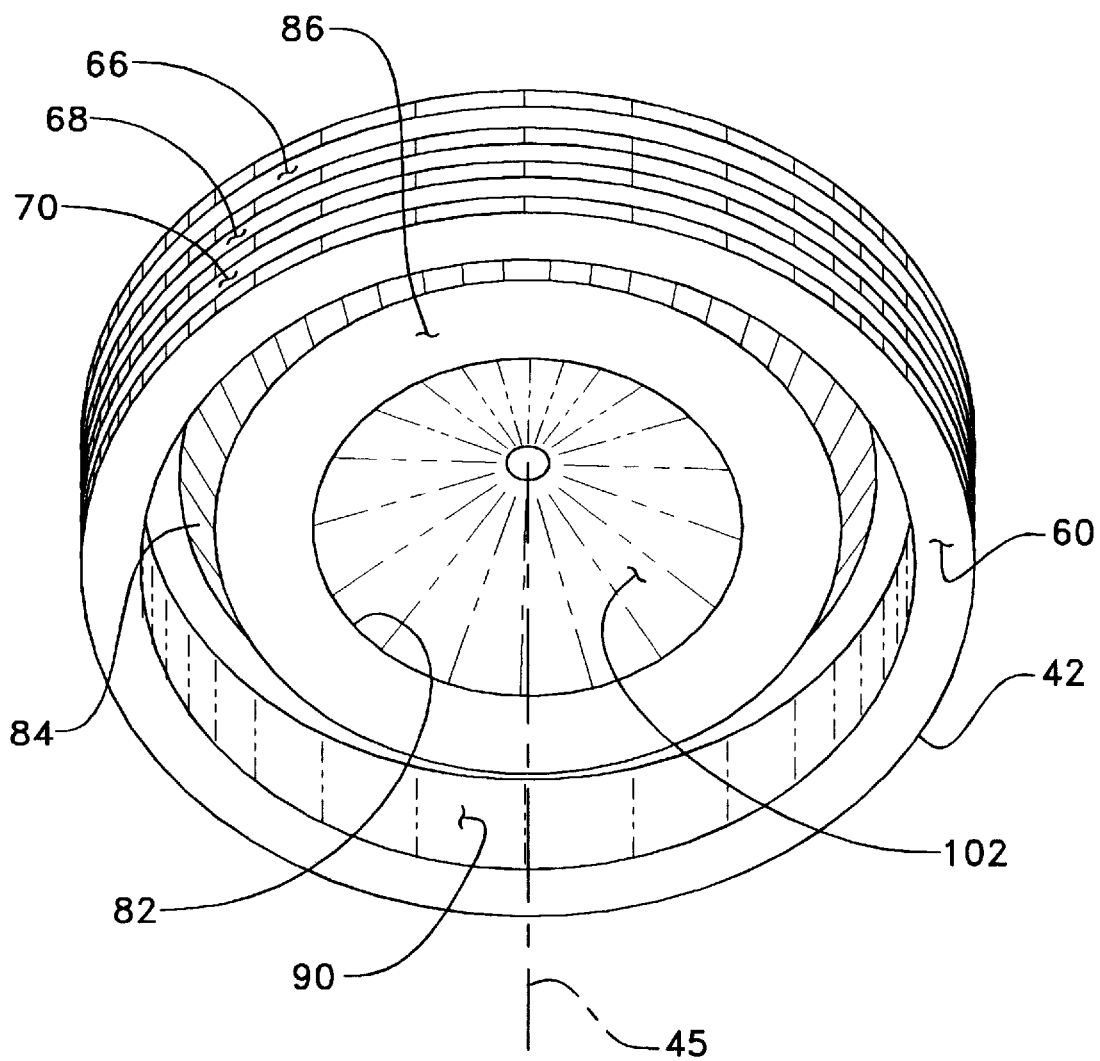
FIG. 3 is an isometric sectioned view of the other piece of the two piece unitary piston.
Figure 4:
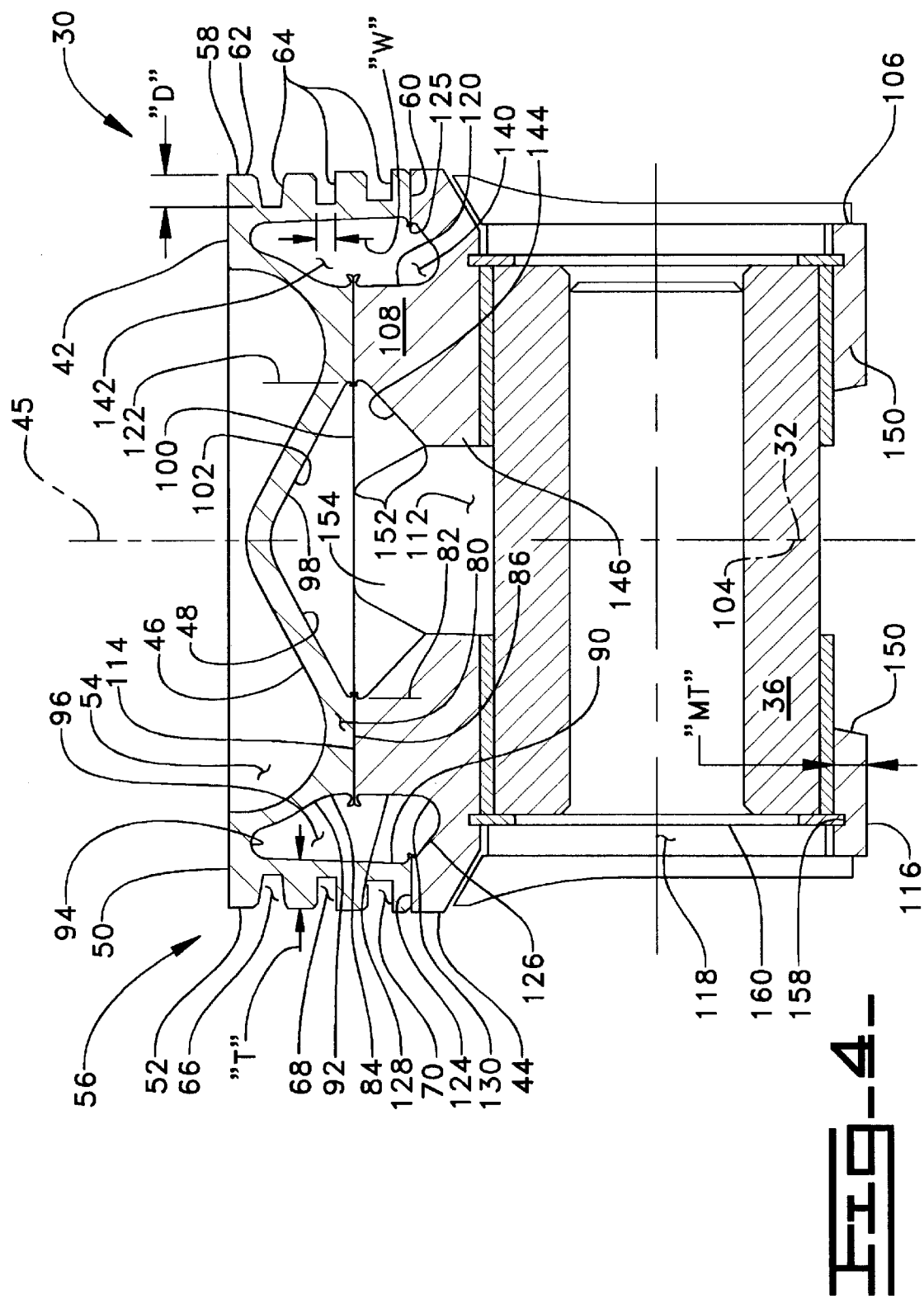
FIG. 4 is an isometric sectioned view of the assembled two piece unitary piston.

Referring to FIGS. 1, 2, 3 and 4, an engine 10 includes a block 12 having a plurality of cylinders 14 therein, of which only one is shown, and a head 16 is attached to the block 12. The head 16 includes an exhaust passage 18, having a flow of exhaust gas designated by the arrows 20 therein, and an intake passage 22, having a flow of intake air designated by the arrows 24 therein. An intake valve 26, or in this application a pair of intake valves, are interposed the intake passage 22 and the respective one of the plurality of cylinders 14. A pair of exhaust valves 28 are interposed the exhaust passage 18 and the respective one of the plurality of cylinders 14.

Positioned in each of the plurality of cylinders 14 is a two piece unitary piston 30 defining an axis 32. A connecting rod 34 is attached to the two piece unitary piston 30 in a conventional manner by a wrist pin 36. A conventional fuel system 38 operatively communicates with the respective cylinder 14 in a convention manner.

The two piece unitary piston 30 includes a first piece or head member 42 being fixedly attached to a second piece or skirt member 44. The head member 42 is made of a steel forging or casting or other conventional method, such as powered metal, having a preestablished structural strength and/or grain flow. The head member 42, as is further shown in FIGS. 3 and 4, has a generally cylindrical configuration having an axis 45 being synonymous with the axis 32 of the two piece unitary piston 30. The head member 42 defines a combustion side 46 and a cooling side 48 being spaced from the combustion side 46 a preestablished distance. As shown in FIG. 1, the combustion side 46 has a force of combustion, represented by the arrows 49, applied thereto. The combustion side 46 defines a crown portion 50 located radially near an extremity 52 of the head member 42. Located radially inward from the crown portion 50 is a crater portion 54 which in this application has a Mexican hat design or configuration.

Extending axially from the crown portion 50 a preestablished distance is a ring band portion 56 having a preestablished thickness "T" thereof. The ring band portion 56 defines a land surface 58 and terminates at a lower extremity or bottom surface 60. The bottom surface 60 has a preestablished surface area. Positioned along the ring band portion 56 and extending a preestablished distance from the crown portion 50 toward the bottom surface 60 is a top land 62. Extending axially along the ring band portion 56 from the top land 62 toward the bottom surface 60, in a respective order, is a plurality of ring grooves 64. The plurality of ring grooves 64 define a preestablished width "W" and a preestablished depth "D". The plurality of ring grooves 64 define a first ring groove 66, a second ring groove 68 interposed the first ring groove 66 and the bottom surface 60 and a third ring groove 70 interposed the second ring groove 68 and the bottom surface 60.

The cooling side 48 includes a support portion 80 being radially spaced inwardly from the ring band portion 56 and is axially spaced between the crown portion 50 and the bottom surface 60. An inner diameter 82 and an outer diameter 84 of the support portion 80 define a mating surface 86 having a preestablished surface area. The cooling side 48 further includes a ring cooling surface or first cooling surface 90. In this application, the ring cooling surface 90 is generally parallel with the land surface 58. The ring cooling surface 90 is spaced from the land surface 58 a preestablished distance which defines the preestablished thickness "T" of the ring band portion 56. The ring cooling surface 90 extends axially upwardly from the bottom surface 60 toward the crown portion 50. Spaced from the ring cooling surface 90 is a gallery or second cooling surface 92. The gallery cooling surface 92 extends upwardly from the mating surface 86 toward the crown portion 50. An upper arcuate cooling surface 94 is positioned a preestablished distance from the crown portion 50 and connects the ring cooling surface 90 with the gallery cooling surface 92. A head ring cooling gallery 96 is defined within the ring cooling surface 90, the upper arcuate cooling surface 94 and the gallery cooling surface 92. An undercrown cooling surface 98 is spaced from a portion of the crater portion 54 a preestablished uniform thickness. The undercrown cooling surface 98, in this application, has a generally frustoconical configuration defining a base member 100 extending along the inner diameter 82 and a cone member 102 extending from the base member 100 toward the crater portion 54.

The skirt member 44 is made of a steel forging or casting or other conventional method, such as powered metal, and defines a preestablished structural strength and/or grain flow. The structural strength of the head member 42 and the skirt member 44 are substantially the same. The skirt member 44, as is further shown in FIGS. 2 and 4, has a generally cylindrical configuration and defines an axis 104 being synonymous with the axis 32 of the two piece unitary piston 30 and the axis 45 of the head member 42. The skirt member 44 includes a strut portion 106 and a base portion 108. The skirt member 44 is defined by an outer extremity 110, an inner extremity 112 having a generally frustoconical configuration with a flattened peak or top, a top surface 114 and a lower surface 116.

The base portion 108 extends from the top surface 114 toward the lower surface 116 a preestablished distance defined by an upper extremity of a radius of a bore 118 extending within the outer extremity 110 of the skirt member 44. The bore 118 is perpendicular to the axis 32 of the two piece unitary piston 30, the axis 45 of the head member 42 and the axis 104 of the skirt member 44. The top surface 114 is defined by an outer or first diameter 120 being equivalent to that of the outer diameter 84 of the support portion 80 and an inner or second diameter 122 being equivalent to that of the inner diameter 82 of the support portion 80. The top surface 114 has a preestablished surface area being substantially equal to the preestablished surface area of the mating surface 68 of the head member 42. However, as an alternative, the preestablished surface area of the mating surface 68 and the top surface 114 could be larger or smaller as one is compared to the other. The top surface 114 is positioned substantially in alignment with the mating surface 86. Spaced axially and radially from the top surface 114 is a ring band support surface 124 being positioned substantially in alignment with the bottom surface 60 of the ring band portion 56. The ring band support surface 124 extends radially inward from the outer extremity 110 a preestablished distance and has an inner diameter 125 being axially aligned with the ring cooling surface 90 of the cooling side 48 of the head member 42. The ring band support surface 124 has a preestablished surface area being substantially equal to that of the preestablished surface area of the bottom surface 60 of the head member 42. A lower cooling surface 126 extends downwardly from the position at which the ring band support surface 124 axially aligns with the ring cooling surface 90 at an obtuse angle to the ring band support surface 124. An axial cooling surface 128 extends downwardly from the top surface 114 from the outer diameter 120 and is axially aligned with the gallery cooling surface 92 of the head member 42. A lower arcuate cooling surface 130 connects the lower cooling surface 126 and the axial cooling surface 128. A skirt member cooling gallery 140 is defined within the lower cooling surface 126, the lower arcuate cooling surface 130 and the axial cooling surface 128. The head ring cooling gallery 96 and the skirt member cooling gallery 140 combined define a piston cooling gallery 142. Extending downwardly from the inner diameter 122 of the top surface 114 and at an angle to the top surface 114 is a crater underside cooling surface 144. Positioned between the bore 118 and the outer extremity 110 of the skirt member 44 is a tapered surface 146.

The strut portion 106 extends from the lower surface 116 to a predetermined distance defined by the upper extremity of the radius of the bore 118. The bore 118 is positioned in the strut portion 106 of the skirt member 44 and defines a preestablished material thickness designated as "MT". "MT" is defined between the lower surface 116 and the radius of the bore 118. The inner extremity 112, with the strut portion 106 and the base portion 108 connected extends from the lower surface 116 upwardly past the thickness "MT", through the bore 118, and exits near the top surface 114. The inner extremity 112 is defined by a pair of tapered sides 150. The tapered sides 150 extend from the lower surface 116 to the point of intersection of the crater underside cooling surface 144 with the inner extremity 112. The tapered sides 150 are perpendicular to the axis of the bore 118 and are at an angle to the axis 32 of the two piece unitary piston 30, thus, forming the taper. A pair of radiused portions 152 connected the respective tapered sides 150 and define the remainder of the inner extremity 112. A pair of openings 154,156 communicate with the skirt member cooling gallery 140 and define a coolant inlet 154 and a coolant outlet 156. A snap ring groove 158, having a preestablished thickness and depth, is positioned in each end of the bore 118. And, a snap ring 160 is removably positioned in the snap ring groove 156.

The head member 42 is formed from steel by preferably a forging process or, as an alternative, a casting process in a conventional manner. A portion of the head member 42 features, such as, the bottom surface 60, the rough cut ring grooves 64, the mating surface 86, and the head ring cooling gallery 96 are premachined. And, the skirt member 44 is formed from steel by preferably a forging process or a casting process in a conventional manner. A portion of the skirt member 44 features, such as, the top surface 114, the bore 118 and the ring band support surface 124 are premachined. Thus, the head member 42 and the skirt member 44 are ready to be fixedly connected by a welding process 166 forming the two piece unitary piston 30.

A method or process 166 is comprised of the following steps. The head member 42 is positioned in an inertia welding machine 168, as is best shown in FIG. 5. The inertia welding machine 168 has a central axis 170 about which is positioned a first chuck member 172 near a first end 174. A second chuck member 176 is also positioned about the central axis 170 near a second end 178. The first end 174 is spaced from the second end 178 a preestablished distance. Each of the first chuck member 172 and the second chuck member 178 includes a plurality of jaws 180 being radially adjustable about the central axis 170. The axis 45 of the head member 42 is aligned with the central axis 170 of the first chuck member 172 in a conventional manner using the adjustable plurality of jaws 180. The skirt member 44 is positioned in the second chuck member 178 and using the adjustable plurality of jaws 180 is centered so that the axis 104 of the skirt member 44 is aligned with the central axis 170 of the inertia welding machine 168. With each of the head member 42 and the skirt member 44 axially aligned, the first chuck member 172 is rotated by a motor, not shown, to a predetermined velocity. With the head member 42 at the predetermined velocity, the first chuck member 172 is moved axially toward the second chuck member 174 which, in this application, remains fixed in a stationary position. As the head member 42, the bottom surface 60 and the mating surface 86, interfaces with the skirt member 44, the ring band support surface 124 and the top surface 114 respectively, an axial force is applied to the first chuck member 174. The result being a friction weld between the head member 42 and the skirt member 44. After the welding step, the resulting two piece unitary piston 30 is finished machined in a conventional manner.

It should be understood that the position and location of the bottom surface 60 and the mating surface 86 of the head member 42 relative to the position and location of the ring band support surface 124 and the top surface 114 can be varied without changing the essence of the invention. For example, the axial relationship of the bottom surface 60 and the mating surface 86 relative to the ring band support surface 124 and the top surface 114 could be varied.

INDUSTRIAL APPLICABILITY

In use, the engine 10 is started. Fuel is supplied to each of the plurality of cylinders 14 by the fuel system 38. Combustion occurs and the two piece unitary piston 30 has the force applied thereon and the stresses applied thereto. For example, as illustrated in FIG. 1, and shown by the arrows 49, the force causing the stress is shown. As is shown, a force is applied to the crown portion 50. With the top surface 114 of the skirt member 44 in contacting relationship to the mating surface 86 forces applied to the head member 42 is transferred through the base portion 108 to the wrist pin 36 and the connecting rod 34. Additional force results in a moment about the axis 45. With the supporting structure of the skirt member 44 having substantially the same structural strength as the head member 42 and the ring band supporting surface 124 being in contacting and supporting relationship with the bottom surface 60 of the ring band portion 56 any moment about the axis 45 is resisted. Thus, the structural integrity of the two piece unitary piston 30 is improved and results in increased life, longevity and decreased down time.

Additionally, with the construction of the head member 42, the preestablished thickness "T" of the ring band portion 56 is easily accessible for machining. Thus, as the lubricating and cooling oil enters the piston cooling gallery 148 through the coolant inlet 154 the lubricating and cooling oil is distributed along the ring cooling surface 90. With the preestablished thickness "T" being controlled the ring band portion 56, in which the plurality of rings 64 are positioned, is appropriately cooled. For example, as the two piece unitary piston 30 moves axially the lubricant and coolant trapped with in the cooling gallery 148 is shaken along the ring cooling surface 90, the upper arcuate cooling surface 94 and the gallery cooling surface 92 of the head ring cooling gallery 96, and the lower cooling surface 126, the lower arcuate cooling surface 130 and the axial cooling surface 128 of the skirt member cooling gallery 140. Thus, the life of the two piece unitary piston 30 is increased. After cooling the ring band portion 56, the hot oil escapes the oil cooling gallery 148 through the coolant outlet 156 and is recirculated in a conventional manner.

Addition lubricant and coolant is directed along the undercrown cooling surface 98 and with the crater underside cooling surface 144 being at an angel to the top surface 114, lubricant and coolant is directed to the interface of the wrist pin 36 and the connecting rod 34. For example, as the lubricant and coolant is directed along the frustoconical configuration the lubricant and coolant strikes the cone member 102 and flows toward the base member 100. As the lubricant and coolant exits from the base member 100 the lubricant and coolant comes in contact with the crater underside cooling surface 144 and is directed to the interface of the wrist pin 36 and the connecting rod 34. Thus, the flow of lubricant is improved with the structural configuration of the two piece unitary piston 30.

The two piece unitary piston 30 is easily manufactured. For example, the structural configuration of the head member 42 and the skirt member 44 can be easily rough and finished machined. The structural integrity is improved with the use of materials having the same structural integrity. Bending forces are resisted and increased life is made available with the structural configuration of two piece unitary piston 30 welded structure.

Other aspects, objects and advantages of this invention can be obtained from a study of the drawings, the disclosure and the appended claims.

What is claimed is:

1. A two piece unitary piston being adapted for use with an engine, said two piece unitary piston comprising:

a head member being made of a material having a preestablished material strength, having a crown portion to which is connected a ring band portion having a plurality of ring grooves therein, defining a bottom surface being axially positioned below said plurality of ring grooves and having a support portion defining a mating surface having a preestablished surface area;

a skirt member being made of a material having a preestablished material strength being substantially the same as the preestablished material strength of said head member, having a ring band support surface being aligned with the bottom surface and having a top surface being aligned with said mating surface said skirt member being void of a ring groove;

said head member and said skirt member being joined forming said two piece unitary piston, said joining being at the interface of said bottom surface and said mating surface, and said ring band support surface and said top surface respectively; and said joining being formed by an inertia welding process.

2. The two piece unitary piston of claim 1 wherein each of said head member and said skirt member are made of steel.

3. The two piece unitary piston of claim 2 wherein each of said head member and said skirt member are formed as a forging.

4. The two piece unitary piston of claim 2 wherein said head member is formed as a forging and said skirt member is formed as a casting.

5. The two piece unitary piston of claim 2 wherein said head member is formed as a casting and said skirt member is formed as a forging.

6. The two piece unitary piston of claim 1 wherein said interface of said bottom surface and said ring band support surface being radially spaced from said interface of said mating surface and said top surface.

7. The two piece unitary piston of claim 6 wherein said bottom surface and said ring band support surface being axially spaced from said interface of said mating surface and said top surface.

8. The two piece unitary piston of claim 7 wherein said head member defining a combustion side and said interface of said mating surface and said top surface being closer thereto than said interface of said bottom surface and ring band support surface.

9. The two piece unitary piston of claim 1 further comprising a piston cooling gallery.

10. The two piece unitary piston of claim 9 wherein said piston cooling gallery includes a head ring cooling gallery being positioned within said head member and a skirt member cooling gallery being positioned within said skirt member.

11. The two piece unitary piston of claim 9 wherein said piston cooling gallery includes a coolant inlet and a coolant outlet.

* * * * *

(12) EX PARTE REEXAMINATION CERTIFICATE (6030th)
United States Patent
Jarrett

(10) Number: US 6,155,157 C1
(45) Certificate Issued: Dec. 4, 2007

(54) TWO PIECE UNITARY PISTON WITH INERTIA WELDED HEAD AND SKIRT MEMBERS

(75) Inventor: Mark W. Jarrett, Morton, IL (US)

(73) Assignee: Caterpillar Inc., Peoria, IL (US)

Reexamination Request:
No. 90/007,090, Jun. 17, 2004

Reexamination Certificate for:
| | |
|---|---|
| Patent No.: | 6,155,157 |
| Issued: | Dec. 5, 2000 |
| Appl. No.: | 09/167,444 |
| Filed: | Oct. 6, 1998 |

(51) Int. Cl.
*F02B 23/06* (2006.01)
*F02B 23/02* (2006.01)
*B23D 15/10* (2006.01)
*F02F 3/00* (2006.01)

(52) U.S. Cl. .................................. 92/186; 92/231
(58) Field of Classification Search ................. None
See application file for complete search history.

(56) References Cited

U.S. PATENT DOCUMENTS

| | | | | |
|---|---|---|---|---|
| 2,159,989 A | * | 5/1939 | Hazen et al. ................. | 92/231 |
| 3,319,536 A | * | 5/1967 | Kohl et al. .................. | 92/231 |
| 3,485,143 A | | 12/1969 | Canady | |
| 4,581,983 A | * | 4/1986 | Moebus ....................... | 92/186 |
| 4,727,795 A | * | 3/1988 | Murray et al. ................ | 92/189 |
| 5,065,508 A | | 11/1991 | Lorento et al. | |
| 5,150,517 A | * | 9/1992 | Martins Leites et al. | 29/888.04 |
| 5,309,818 A | | 5/1994 | Mendes et al. | |
| 5,394,788 A | | 3/1995 | Mendes et al. | |
| 5,934,174 A | * | 8/1999 | Abraham et al. ............. | 92/222 |
| 6,032,619 A | * | 3/2000 | Zhu et al. ................ | 123/41.35 |

FOREIGN PATENT DOCUMENTS

| | | |
|---|---|---|
| EP | A-0 330 005 B1 | 8/1989 |
| EP | 520536 A1 * | 12/1992 |
| FR | 1 410 387 A | 12/1965 |
| GB | 1 501 387 | 2/1978 |
| GB | A-2 269 336 | 2/1994 |
| JP | 60 166157 A | 8/1985 |
| JP | 03194116 A * | 8/1991 |
| JP | 04276119 A * | 10/1991 |
| JP | 6002613 A | 1/1994 |
| WO | WO 80/02308 A | 10/1980 |

OTHER PUBLICATIONS

Source book on Innovative Welding Processes, pp. 37–48, Copyright 1981 by the American Society for Metals ISBN: 0–87170–105–7.*

Diesel Engine Reference Book, Second Edition, Edited by Bernard Challen Rodica Baranescu Chapter 14, pp. 349–369, Butterworth–Heinemann, A division of Reed Educational of Professional Publishing Ltd First published 1984, Second edition 1999.*

Materials and Processes in Manufacturing, fifth edition□□E. Paul DeGarmo, P.E., Macmillan Publishing Co., Inc. NY□□Copyright 1979, "Friction Welding" pp. 884–885.*

Simulation of Secondary Dynamics of Articulated and Conventional Piston Assemblies, *Dursunkaya et al.*, SAE Technical Paper Series, 920484, Feb. 24–28, 1992, pp. 21–31.

* cited by examiner

*Primary Examiner*—Beverly M. Flanagan

(57) ABSTRACT

Past pistons have been susceptible to reduced longevity due to increased forces of combustion thereon during operating cycles of an engine. The present two piece unitary piston increases the longevity of pistons used with increased forces of combustion. For example, a head member has a crown portion defining a ring band portion having a bottom surface and a support portion. And, a skirt member defines a ring band support surface and a top surface. The head member and the skirt member have a preestablished material strength being generally the same. The head member and the skirt member are joined by an inertia welding process. The force of combustion acting on the crown portion is resisted by the ring band support surface being in contacting relationship with the bottom surface. Thus, the skirt member structure supports and resists the bending moment of the combustion forces on the head member.

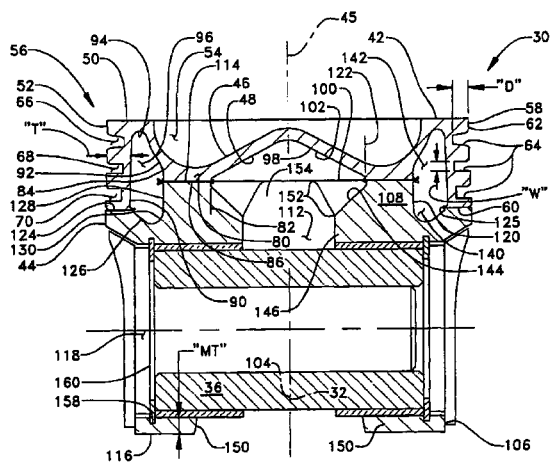

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–11 are cancelled.

\* \* \* \* \*